(12) United States Patent
Kaathoven Van et al.

(10) Patent No.: US 9,328,033 B2
(45) Date of Patent: May 3, 2016

(54) PROCESS FOR PRODUCING A COATED FERTILIZER

(75) Inventors: Hendrikus Gijsbertus Andrianus Kaathoven Van, Nieuwstadt (NL); Hoa Xuan Bui, Nieuwstadt (NL)

(73) Assignee: EKOMPANY INTERNATIONAL B.V., Born (NL)

( * ) Notice: Subject to any disclaimer, the term of this patent is extended or adjusted under 35 U.S.C. 154(b) by 0 days.

(21) Appl. No.: 14/240,884

(22) PCT Filed: Aug. 24, 2012

(86) PCT No.: PCT/EP2012/066527
§ 371 (c)(1),
(2), (4) Date: Feb. 25, 2014

(87) PCT Pub. No.: WO2013/030118
PCT Pub. Date: Mar. 7, 2013

(65) Prior Publication Data
US 2014/0255605 A1 Sep. 11, 2014

(30) Foreign Application Priority Data
Aug. 26, 2011 (EP) .................................. 11006982

(51) Int. Cl.
*C05G 3/00* (2006.01)
*C05C 9/00* (2006.01)
(Continued)

(52) U.S. Cl.
CPC .............. *C05G 3/0029* (2013.01); *B01J 2/006* (2013.01); *B01J 2/12* (2013.01); *C05B 7/00* (2013.01);
(Continued)

(58) Field of Classification Search
CPC ....................................................... C05G 3/0029
USPC .............................................. 71/64.07, 64.11
See application file for complete search history.

(56) References Cited

U.S. PATENT DOCUMENTS 3,223,518 A 12/1965 Hansen
3,285,223 A * 11/1966 Sahlin .............................. 118/64

(Continued)

FOREIGN PATENT DOCUMENTS

EP 0744212 A2 11/1996
EP 1172347 A2 1/2002

(Continued)

*Primary Examiner* — Wayne Langel
(74) *Attorney, Agent, or Firm* — Hudak, Shunk & Farine Co. LPA

(57) ABSTRACT

A process for producing polyurethane coated fertilizer granules having core granules in a rotating drum, wherein the drum has an inlet and an outlet and n application zones arranged along the longitudinal direction of the drum between the inlet and the outlet, n being an integer of at least 2 and wherein each of the application zones is followed by a curing zone. The curing zone after each application zone is arranged to allow an interval of 2-15 minutes, preferably 3-5 minutes, before the application in the successive application zone, wherein the polyol and the isocyanate are applied in the first application zone at a ratio of 0.5-4 wt %, preferably 1-3 wt % of the core granules. The process has the steps of: A) continuously feeding the core granules to the inlet of the rotating drum, thereby providing a flow of the core granules in the direction from the inlet to the outlet, B1) applying a polyol and an isocyanate to the core granules in each of the n application zones, the ratio of hydroxyl groups in the polyol to NCO groups in the isocyanate at the end of each of the application zones being in the range from about 0.9 to about 1.3, B2) reacting the polyol and the isocyanate to form a tack-free polyurethane layer in each of the n curing zones and C) continuously collecting the polyurethane coated fertilizer granules from the outlet.

20 Claims, 2 Drawing Sheets

(51) Int. Cl.

| | | |
|---|---|---|
| *C05D 1/00* | (2006.01) | |
| *C05B 7/00* | (2006.01) | |
| *C05C 1/00* | (2006.01) | |
| *B01J 2/00* | (2006.01) | |
| *C08G 18/10* | (2006.01) | |
| *C09D 175/04* | (2006.01) | |
| *B01J 2/12* | (2006.01) | |

(52) U.S. Cl.
CPC ... *C05C 1/00* (2013.01); *C05C 9/00* (2013.01); *C05D 1/00* (2013.01); *C08G 18/10* (2013.01); *C09D 175/04* (2013.01)

(56) References Cited

U.S. PATENT DOCUMENTS

| | | | |
|---|---|---|---|
| 4,019,890 | A | 4/1977 | Fujita et al. |
| 4,042,366 | A | 8/1977 | Fersch et al. |
| 4,549,897 | A | 10/1985 | Seng et al. |
| 4,636,242 | A | 1/1987 | Timmons |
| 4,657,576 | A | 4/1987 | Lambie |
| 4,711,659 | A † | 12/1987 | Moore |
| 4,880,455 | A | 11/1989 | Blank |
| 5,186,732 | A | 2/1993 | Thompson et al. |
| 5,405,426 | A | 4/1995 | Timmons et al. |
| 5,538,531 | A * | 7/1996 | Hudson .................... B01J 2/003 71/28 |
| 5,599,374 | A † | 2/1997 | Detrick |
| 6,045,810 | A | 4/2000 | Moore |
| 6,358,296 | B1 † | 3/2002 | Markusch |
| 6,663,686 | B1 * | 12/2003 | Geiger et al. ................ 71/28 |
| 7,682,656 | B2 | 3/2010 | Xing et al. |
| 7,713,326 | B2 * | 5/2010 | Carstens et al. ............... 71/28 |
| 7,771,505 | B2 | 8/2010 | Ogle et al. |
| 8,906,451 | B2 * | 12/2014 | Fujii et al. ..................... 427/217 |
| 2004/0020254 | A1 * | 2/2004 | Wynnyk et al. .............. 71/64.11 |
| 2005/0076687 | A1 † | 4/2005 | Whittington |
| 2006/0115586 | A1 * | 6/2006 | Xing ........................ B01J 2/006 427/212 |
| 2010/0011825 | A1 | 1/2010 | Ogle et al. |
| 2010/0233332 | A1 † | 9/2010 | Xing |
| 2014/0033779 | A1 * | 2/2014 | Bertin .................... A01N 25/26 71/64.07 |

FOREIGN PATENT DOCUMENTS

| | | | |
|---|---|---|---|
| GB | 1453258 | | 10/1976 |
| GB | 1482213 | | 8/1977 |
| WO | 9963817 | A1 | 12/1999 |
| WO | 2009022431 | A1 | 2/2009 |
| WO | 2011/043335 | * | 4/2011 |

\* cited by examiner
† cited by third party

PROCESS FOR PRODUCING A COATED FERTILIZER

FIELD OF THE INVENTION

The present invention relates to a process for producing a coated fertilizer.

BACKGROUND OF THE INVENTION

Coated (or encapsulated) fertilizers are known to be very effective sources to provide controlled release of nutrients for the feeding of plants. The nutrients are released at controlled rates through the fertilizer's coating resulting in a sustained feeding of plants. As a result, one application of these so-called controlled release fertilizers can provide the necessary nutrients for a plant that would take multiple applications of soluble or non coated fertilizers.

These coated fertilizers may be classified into two major groups according to the fertilizer release mechanism. One type of coated fertilizer in wide use is sulfur coated fertilizer, such as disclosed in U.S. Pat. Nos. 4,042,366; 4,636,242 and 5,405,426. The release of nutrients from sulfur-coated fertilizers occurs by diffusion through imperfections in the sulfur coating and through coating breakdown. The major advantage of the sulfur coated fertilizers is their relatively low cost.

A second type of controlled release fertilizer utilizes solvent applied polymer coatings. The polymeric materials applied are either thermosetting resins or thermoplastics. Examples of solvent applied thermosetting resin coated fertilizers which are currently in use are disclosed in U.S. Pat. Nos. 3,223,518; 4,657,576 and 4,880,455; whereas examples of fertilizers having thermoplastic coatings are disclosed in U.S. Pat. No. 4,019,890. Another type of encapsulated fertilizer that exhibits good controlled release properties is latex coated granular fertilizers such as those disclosed in U.S. Pat. Nos. 4,549,897 and 5,186,732. Both solvent and latex applied polymer coated fertilizers offer important benefits over sulfur-coated products in regard to consistency of release rates. The majority of nutrient release is by diffusion through pores in the polymer coating, rather than release through coating imperfections.

Improvements to the process for producing a coated fertilizer have been investigated. U.S. Pat. No. 7,682,656 describes a process which aims to product a coated product having a low coating weight and a good slow release profile. The process comprises the steps of a) coating a substrate with a coating material to form a coated substrate; and b) stabilizing the coated substrate to form the coated product. The operating parameter of substrate-substrate contact and coated substrate-coated substrate contact differs between step a) and step b), such that in step b) the contact is minimized. In the example, the process is performed by using one rotating drum and applying different rotating speeds for the coating step and the stabilizing step.

There is a constant need in the industry for a more efficient process for producing a coated fertilizer.

SUMMARY OF THE INVENTION

It is an objective of the present invention to provide a more efficient process for producing a coated fertilizer.

The present invention provides a process for producing polyurethane coated fertilizer granules comprising core granules in a rotating drum, wherein the drum comprises an inlet and an outlet and n application zones arranged along the longitudinal direction of the drum between the inlet and the outlet, n being an integer of at least 2 and wherein each of the application zones is followed by a curing zone, wherein the curing zone after each application zone is arranged to allow an interval of at least 2 minutes before the application in the successive application zone, wherein the polyol and the isocyanate are applied in the first application zone at a ratio of 0.5-4 wt %, preferably 1-3 wt % of the core granules, the process comprising the steps of: A) continuously feeding the core granules to the inlet of the rotating drum, thereby providing a flow of the core granules in the direction from the inlet to the outlet, B1) applying a polyol and an isocyanate to the core granules in each of the n application zones, the ratio of hydroxyl groups in the polyol to NCO groups in the isocyanate at the end of each of the application zones being in the range from about 0.9 to about 1.3, B2) reacting the polyol and the isocyanate to form a tack-free polyurethane layer in each of the n curing zones, C) continuously collecting the polyurethane coated fertilizer granules from the outlet.

It was surprisingly found that the process of the present invention allows providing a polyurethane coated fertilizer in a continuous manner. The continuous process according to the present invention is much more efficient than a batch process.

By continuously feeding the core granules to the rotating drum, the core granules move from the inlet towards the outlet. In the process of moving through the drum, the core granules go through the multiple application zones, in each of which the reactants for forming polyurethane, i.e. polyol and isocyanate, are applied. The core granules are coated with the reactants, and a polyurethane layer is formed from the reactants in each of the curing zones. Polyurethane coated core granules are collected from the outlet. It was surprisingly found that this can be performed in a single rotating drum rotating at a constant speed, which makes the process simple and efficient.

The application of the reactants is performed in multiple steps. An application zone starts at a position at which one of the reactants is applied and terminates at a position at which the other reactant is applied to give a ratio of hydroxyl groups in the polyol to NCO groups in the isocyanate of from about 0.9 to about 1.3. In each of the application zones, the reactants may be applied in any order, as long as the ratio of hydroxyl groups in the polyol to NCO groups in the isocyanate at the end of each of the application zones is in the range from about 0.9 to about 1.3. For example, polyol and isocyanate in this ratio may be applied at the same longitudinal position. Alternatively, an application zone may be arranged so that one of the reactants is applied first and the other reactant is applied in a longitudinal position closer to the outlet. It is also possible to arrange an application zone so that one of the reactants are applied multiple times before the other reactant is applied.

The ratio of hydroxyl groups in the polyol to NCO groups in the isocyanate at the end of the first application zone is calculated from the total amount of the polyol and the isocyanate applied in the first application zone. The ratio of hydroxyl groups in the polyol to NCO groups in the isocyanate at the end of the second (and possible further) application zones is calculated from the total amount of the polyol and the isocyanate applied up to that point, i.e. the total of the applied amount in the first application zone and the second (and possible further) application zone.

The term "tack-free" is herein understood to mean that the surface no longer feels sticky. In a more structured way, it can be determined by briefly pressing a polyethylene film against the surface and checking for any adhering material when the film is removed. It may also be determined by ASTM C679-03(2009)e1.

In the first application zone, the reactants are applied to the core granules. The core granules coated with the reactants are pushed to the curing zone that follows the first application zone by the new incoming core granules. In the first curing zone, a first polyurethane layer is formed as the amount of the reactants present on the core granules decreases. At the end of the first curing zone, the core granules are provided with a tack-free polyurethane coating. The core granules provided with the first polyurethane layer is pushed to a position at which one or both of the reactants are applied, which marks the start of the second application zone. The reactants are applied again thereon in the manner as described above. The granules will move on to the second curing zone in which a second polyurethane layer is formed from the reactants applied in the second application zone.

In the last (nth) curing zone, stabilization of the polyurethane coating also occurs. Therefore, the last curing zone may be longer than the previous curing zone(s).

In the batch process, the rotation of the drum is performed such that the core granules are mixed homogeneously over the length of the drum, i.e. the direction of the axis of the rotation. The core granules move in both directions of the axis of the rotation. In comparison, the process of the present invention is performed so that the core granules move substantially only in one direction in the axis of the rotation. The rotation in combination with the feeding of the core granules is believed to provide a plug flow in the direction of the drum. Hence, the thickness of the coating on the core granules varies along the axis. The distribution of the thickness of the coating at each of the longitudinal positions of the drum is represented by a Gaussian curve.

The number of the application zones in the coating zone may vary, e.g. between 2-15, more preferably 2-7. The curing zone after each application zone is arranged to allow an interval of at least 2 minutes before the application in the successive application zone. The curing zone after each application zone is preferably arranged to allow an interval of 2-15 minutes, preferably 3-5 minutes, before the application in the successive application zone. This ensures that the reactants are cured to form a tack-free coating layer before the next application of the reactants. The intervals in each curing zone may be the same or may vary.

Achieving a desired curing time is strongly dependent on the length between two successive application zones, as well as parameters such as the feed rate of the core granules and the reactants, the temperature of the drum and the diameter of the drum. The optimum combination of the relevant parameters can be determined through routine experiments for achieving a desired curing time.

Preferably, the core granules are fed to the inlet of the drum such that the residence time in the drum is 20-90 minutes. The residence time depends on process parameters and required coating thickness. The term 'residence time' is herein understood to mean the period from the time point at which the core granules are fed to the inlet of the drum to the time point at which the core granules are collected at the outlet of the drum. This ensures enough stabilization time of the coating. The feed rate of the core granules and the size, i.e. the diameter and the length, of the drum may be adjusted to achieve the desired residence time.

The polyol and the isocyanate are applied in the first application zone at a ratio of 0.5-4 wt %, preferably 1-3 wt %, of the core granules. This results in the first layer of the polyurethane coating properly adhered to the core granule that allows further coating layers. It was found that when the first layer is not properly adhered, it becomes very difficult to obtain good final product irrespective of the successive layers.

Preferably, the coated polyurethane is 3-20 wt %, preferably 4-15 wt %, of the core granules as calculated from the feed rates of the core granules and the polyol and the isocyanate.

Preferably, the polyol and the isocyanate are applied substantially simultaneously in each of the application zones. The term "substantially simultaneously" is herein meant that the feeding position of the polyol and the feeding position of the isocyanate are substantially the same. The period during which only one of the polyol and the isocyanate is present on the granule is short. The polyol and the isocyanate may also contact each other before contacting the granules.

Preferably, a catalyst for the reaction of the polyol and the isocyanate is introduced to the drum. Examples of catalysts useful in the present invention are dibutyl tin dilaurate, tertiary diamines such as triethylene diamine, N,N-dimethyl ethanol amine and 4-phenylpropylpyridin. The catalyst may be fed to the drum separately or together with the other components. As the catalysts co-react with the polyol and isocyanate mixture, a liquid catalyst is preferred above a gaseous catalyst to reduce safety and environmental issues. Preferably, the liquid catalyst is premixed with the polyol or the isocyanate before feeding to the drum, the polyol being more preferred. Preferably, the drum is maintained at a temperature of 40-110° C., preferably 50-90° C. during the process.

Preferably, the rotating drum is rotated at a speed of 5-100 cm/sec during the process, more preferably 10-50 cm/sec.

Typically, the rotating drum in a commercial system has a diameter of 1-3 m, depending on process parameters and desired capacity.

Preferably, the drum is provided with baffles for ensuring the proper mixing characteristics of the granules in each of the zones. The baffles should be arranged so that the general movement of the granules in the direction from the first application zone to the last application zone is not inhibited. Preferably, the baffles extend substantially in the axis of the rotation direction of the drum and are arranged with a space of 30-100 cm in between, depending on the diameter of the drum and size of the baffles. The baffles preferably ensure an obstruction for free flowing of materials which equate to a height of 1-10% of the diameter of the drum.

The baffles may extend over substantially the whole length of the drum. It is also possible that a first group of the baffles extend over the application zones and a second group of the baffles extend over the last curing zone. In this case, the baffles extending over the last curing zone preferably have a height equal to or smaller than the baffles extending over the application zones.

The core granules comprise at least one fertilizer compound selected from the group consisting of urea, potassium sulphate, potassium chloride, ammonium phosphate, ammonium nitrate and a urea containing compounded fertilizer such as 15-15-15. The core granule may further contain micronutrients or other nutrients. The core granules preferably contain no boron or less than 0.2 wt % of boron.

The polyol and the isocyanate used in the present invention may be any of the ones mentioned in U.S. Pat. No. 7,682,656, as incorporated herein as follows:

The polyol used in the process of the present invention may be any hydroxy-terminated polyol, such as a polyether, polyester, polycarbonate, polydiene, polycaprolactone, or a mixture thereof. Preferred are polyols such as hydroxy-terminated polyhydrocarbons, hydroxy-terminated polyformals, fatty acid triglycerides, hydroxy-terminated polyesters, hydroxymethyl-terminated polyesters, hydroxymethyl-terminated perfluoromethylenes, polyalkylene-ether glycols, polyalkylene-arylene-ether glycols and polyalkylene-ether triols. Preferred polyols include polyethelene glycols, adipic acid-ethylene glycol polyesters, poly(butylene glycol), poly (propylene glycol) and hydroxy-terminated polybutadiene (see, for example, British patent No. 1,482,213). The most preferred are polyether polyols and more preferred are polyether polyols having a molecular weight in the range of from about 60 to about 20,000, more preferably from about 60 to about 10,000 and most preferably from about 60 to about 8,000.

Preferred polyols are also described in U.S. Pat. No. 5,538,531. In U.S. Pat. No. 5,538,531, polyols having from about 2 to about 6 hydroxy groups, and preferably having at least one C10-C22 aliphatic moiety, are described.

The polyol may also be derived from natural sources, such as soybean, corn, canola, but most preferably castor oil, cardol and the like. Polyols derived from natural sources can be used as they are or can be used to derive a synthetic polyol, such as a synthetic polyol based on soybean oil, which is commercially available from Urethane Soy Systems Corp. (Princeton, Ill.).

Another useful class of polyols are oleo polyols, such as described in U.S. Pat. No. 6,358,296.

A mixture of polyols may also be used, for instance, castor oil with ethylene glycol, castor oil with oleo polyol, castor oil with polyethylene glycol, castor oil with polypropylene glycol, or a polypropylene (or polyethylene) glycol mixture of different end groups and molecular weight.

Any suitable isocyanate may be used in the process of the present invention. Generally, the isocyanate compound suitable for use may be represented by the general formula:

$$Q(NCO)_i$$

wherein $Q^1$ is an integer of two or more and Q is an organic radical having the valence of i. Q may be a substituted or unsubstituted hydrocarbon group (e.g., an alkylene or arylene group). Moreover Q may be represented by the formula:

$$Q^1\text{-}Z\text{-}Q^1$$

wherein $Q^1$ is an alkylene or arylene group and Z is chosen from the group consisting of —O—, —O— $Q^1$-, CO—, —S—, —S— $Q^1$-S— and —SO$_2$—. Examples of isocyanate compounds which fall within the scope of this definition include hexamethylene diisocyanate, 1,8-diisocyanato-p-naphthalene, xylyl diisocyanate, (OCNCH$_2$CH$_2$CH$_2$OCH$_2$O)$_2$, 1-methyl-2,4-diisocyanatocyclohexane, phenylene diisocyanates, tolylene diisocyanates, chlorophenylene diisocyanates, diphenylmethane-4,4'-diisocyanate, naphthalene-1,5-diisocyanate, triphenylmethane-4, 4'4"-triisocyanate and isopropylbenzene-alpha-4-diisocyanate.

Q may also represent a polyurethane radical having a valence of i. In this case $Q(NCO)_i$ is a compound which is commonly referred to in the art as a prepolymer. Generally, a prepolymer may be prepared by reacting a stoichiometric excess of an isocyanate compound (as described above) with an active hydrogen-containing compound, preferably the polyols described above. In this embodiment, the polyisocyanate may be, for example, used in proportions of from about 30 percent to about 200 percent stoichiometric excess with respect to the proportion of hydroxyl in the polyol.

The isocyanate compound suitable for use in the process of the present invention may be selected from dimers and trimers of isocyanates and diisocyanates, and from polymeric diisocyanates having the general formula:

$$[Q''(NCO)_i]_j$$

wherein both i and j are integers having a value of 2 or more, and Q'' is a polyfunctional organic radical. Such isocyanates may be used together with compounds having the general formula:

$$L(NCO)_i$$

wherein i is an integer having a value of 1 or more and L is a monofunctional or polyfunctional atom or radical. Examples of isocyanate compounds which fall with the scope of this definition include ethylphosphonic diisocyanate, phenylphosphonic diisocyanate, compounds which contain a —Si—NCO group, isocyanate compounds derived from sulphonamides (QSO$_2$NCO), cyanic acid and thiocyanic acid.

See also, for example, British patent No. 1,453,258 for other examples of useful isocyanate compounds.

Non-limiting examples of suitable isocyanates include: 1,6-hexamethylene diisocyanate, 1,4-butylene diisocyanate, furfurylidene diisocyanate, 2,4-toluene diisocyanate, 2,6-toluene diisocyanate, 2,4'-diphenylmethane diisocyanate, 4,4'-diphenylmethane diisocyanate, 4,4'-diphenylpropane diisocyanate, 4,4'-diphenyl-3,3'-dimethyl methane diisocyanate, 1,5-naphthalene diisocyanate, 1-methyl-2,4-diisocyanate-5-chlorobenzene, 2,4-diisocyanato-s-triazine, 1-methyl-2,4-diisocyanato cyclohexane, p-phenylene diisocyanate, m-phenylene diisocyanate, 1,4-naphthalene diisocyanate, dianisidine diisocyanate, bitoluene diisocyanate, 1,4-xylylene diisocyanate, 1,3-xylylene diisocyanate, bis-(4-isocyanatophenyl)methane, bis-(3-methyl-4-isocyanatophenyl)methane, polymethylene polyphenyl polisocyanates and mixtures thereof.

Particularly preferred isocyanates are those described in U.S. Pat. No. 5,538,531 and U.S. Pat. No. 6,358,296.

An isocyanate mixture may be preferred for some coatings.

BRIEF DESCRIPTION OF THE DRAWINGS

The present invention is hereinafter described more in detail by referring to the drawings in which.

DETAILED DESCRIPTION OF THE INVENTION

Figure 1:
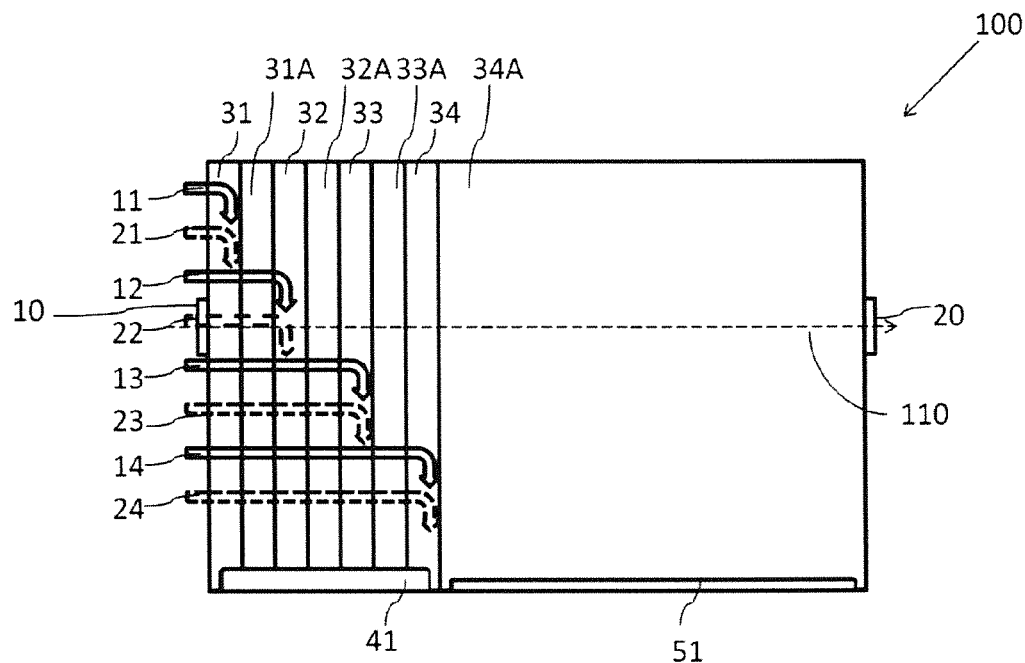
FIG. 1 schematically illustrates an embodiment of the rotating drum used in the present invention.

FIG. 1 schematically illustrates an embodiment of a rotating drum 100 used in the present invention. The rotating drum comprises an inlet 10 for feeding the core granules and an outlet 20 for collecting the polyurethane coated fertilizer granules. The drum rotates around a rotation axis 110. The drum comprises two groups of baffles 41 and 51 provided in different longitudinal positions. It is noted that only one baffle 41 and only one baffle 51 are illustrated in the drawing for ease of understanding, but multiple baffles 41 are provided over the whole diameter of the drum with a certain distance in between.

The rotating drum 100 comprises four application zones 31-34. In the first application zone 31, a polyol is applied by a polyol feeding means 11 and an isocyanate is applied by an isocyanate feeding means 21 such that the ratio of hydroxyl groups in the polyol to NCO groups in the isocyanate is about 0.9 to about 1.3. After the polyol and the isocyanate are applied in the first application position 31, the core granules pass the first curing zone 31A to form a first tack-free polyurethane layer. Similarly, after each of the application zones 32-34 in which the polyol and the isocyanate are applied, the core granules pass the respective curing zones 32A-34A to form a tack-free polyurethane layer. In the curing zone 34A, the last polyurethane layer is formed and the coated polyurethane granules are stabilized.

Each of the feeding means 11-14 and 21-24 may consist of e.g. a tube for feeding polyol or isocyanate. Thus, in this example, eight tubes are inserted in the drum. Each of the tubes has an opening at the respective application position. The polyol and the isocyanate flow through the respective tube and exit from the opening, to be applied to the granules. The rate of the flow and the diameter of the tube is preferably chosen such that the reactants are fed as (continuous) droplets.

The inner wall of the drum 100 is provided with baffles 41 and 51. The baffles 41 are provided extending over the application positions. The baffles 51 are provided extending over the last curing zone. The baffles 51 have smaller height compared to the baffles 41.

Figure 2:
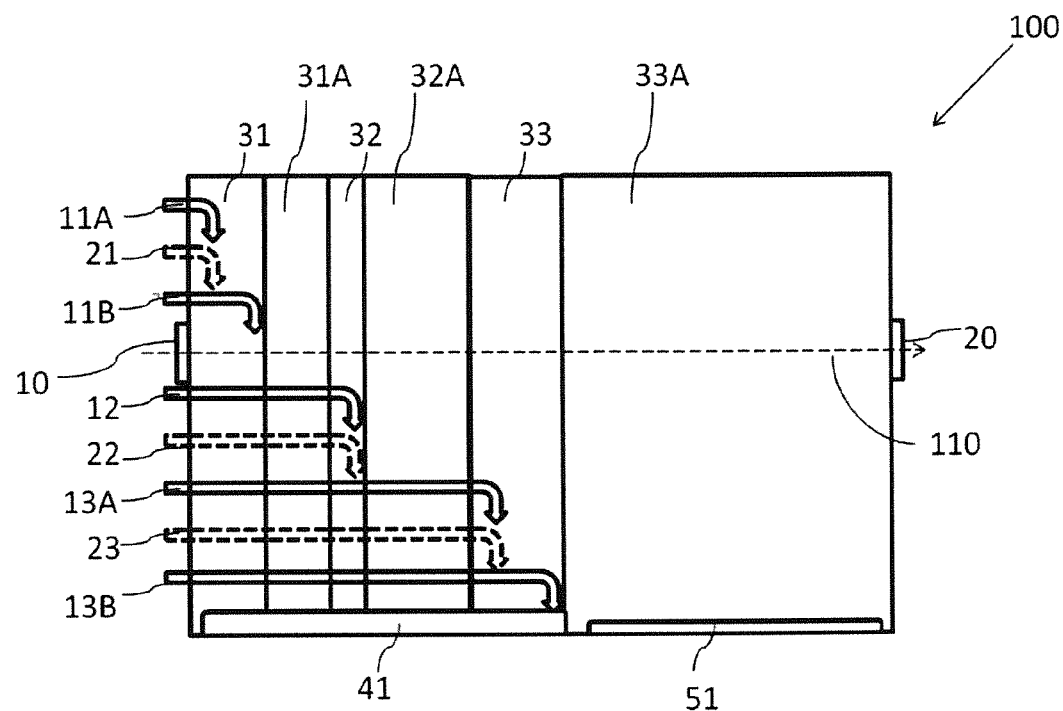
FIG. 2 schematically illustrates a further embodiment of the rotating drum used in the present invention.

FIG. 2 schematically illustrates a further embodiment of the rotating drum 100 used in the present invention. FIG. 2 is similar to FIG. 1 except for the arrangement of the feeding means and application zones.

The rotating drum 100 comprises three application zones 31-33. In the first the application zone 31, a polyol is applied by a polyol feeding means 11A and an isocyanate is applied by an isocyanate feeding means 21 at a first longitudinal position. At this point, the ratio of hydroxyl groups in the polyol to NCO groups in the isocyanate is outside of the range of about 0.9 to about 1.3. At a position in the first application zone 31 farther away from the inlet 10, an additional polyol is applied by a polyol feeding means 11B, to result in the ratio of hydroxyl groups in the polyol to NCO groups in the isocyanate of about 0.9 to about 1.3. The core granules then pass the first curing zone 31A to form a first tack-free polyurethane layer. In the second application zone 32, polyol and isocyanate are applied by a polyol feeding means 12 and an isocyanate feeding means 22, respectively, to result in the ratio of hydroxyl groups in the polyol to NCO groups in the isocyanate of about 0.9 to about 1.3. The core granules then pass the second curing zone 32A to form a second tack-free polyurethane layer. In the third application zone 33, the polyol is applied in two positions by polyol feeding means 13A and 13B, and the isocyanate is applied by an isocyanate feeding means 23 positioned at the same longitudinal position as the polyol feeding means 13A. In the curing zone 33A, the last polyurethane layer is formed and the coated polyurethane granules are stabilized.

EXAMPLES

Experiment set I

General Settings of the Drum Used for the Experiments

The drum is substantially cylindrically shaped having a diameter of 80 cm and a length of 1.6 m. The inner wall of the drum has six baffles extending over the application positions and six baffles extending over the last curing zone. The six baffles are evenly distributed over the diameter. The height of all the baffles are approximately 2 cm. The drum is horizontally placed, i.e. the axis of the cylinder was substantially parallel to the ground during operation. The drum rotation speed was 22 cm/s.

One end of the drum is provided with an inlet for the urea granules and the other end is provided with an outlet. The temperature at the inlet was maintained at a temperature of 56.3-65.7° C. The temperature at the outlet was maintained at a temperature of 78.0-84.6° C. Gas was blown through the drum. The temperature of the gas at the gas exit was 76-79° C.

Five tubes connected to a polyol supply and three tubes connected to an isocyanate supply were inserted through holes provided close to the inlet. The tubes were arranged similar to the manner described in FIG. 2. Tubes were arranged so that the polyol and the isocyanate can drip from the open ends of the tubes at predetermined positions. In the first application zone, a polyol feed and an isocyanate feed was positioned at a longitudinal position 10 cm away from the inlet. A further polyol feed was positioned at a longitudinal position 20 cm away from the inlet. In the second application zone, a polyol feed and an isocyanate feed was positioned at a longitudinal position 30 cm away from the inlet. In the third application zone, a polyol feed and an isocyanate feed was positioned at a longitudinal position 50 cm away from the inlet. A further polyol feed was positioned at a longitudinal position 60 cm away from the inlet.

Example 1

Urea coated with a polyurethane coating was continuously produced in a rotating drum having settings as described above, according to the present invention.

Preheated urea granules were fed to the drum as described above through its inlet at a rate of 42 kg/hour.

The polyol used was a modified phenolic resin with natural oils. The polyol was fed through the five tubes at a rate of 6.0 g/min which dose the polyol at the five application positions. A prepolymerized methylene diphenyl diisocyanate (p-MDI) was fed through three tubes at a rate of 10 g/min which dose the p-MDI at the three application positions. At the end of each of the application zones hydroxyl groups in the polyol to NCO groups in the isocyanate was 1.1-1.3.

After 6.26 hours approx. 273 kg of coated urea having 7.5 wt % of coating was produced. The granules were visually observed and determined to be all properly coated and fully polymerized.

Figure 3:
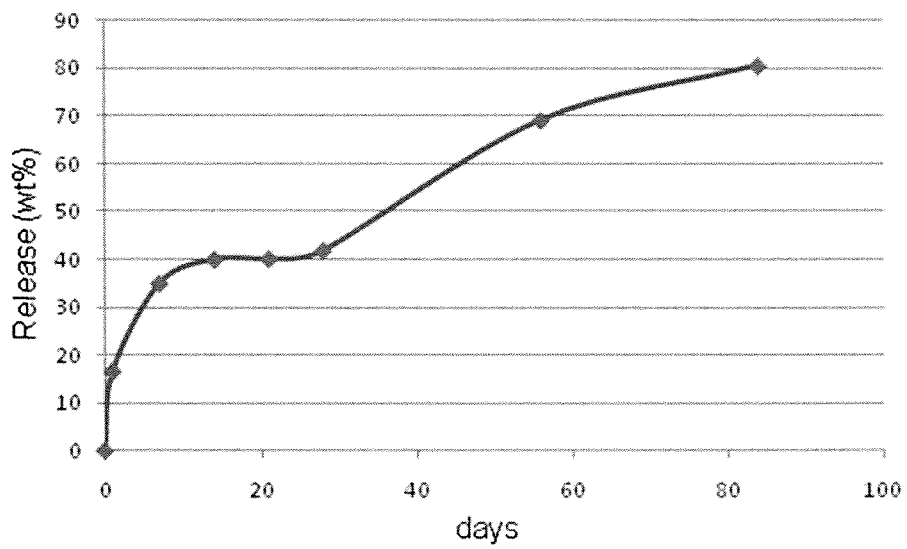
FIG. 3 shows a graph of the release profile of polyurethane coated urea produced according to the process of the present invention and FIG. 4 shows a graph of the release profile of polyurethane coated urea produced according to a batch process.

The urea release profile of the granules made according to this example is shown in FIG. 3. Good slow release properties are observed.

Comp. Ex. A

Urea coated with a polyurethane coating was produced in a batch-wise process.

1 kg of urea was coated with 31.9 g of the polyol and 31.9 g of the prepolymerized MDI mixture (weight ratio 1:1) without use of a catalyst, to result in a coating of 6 wt %.

1 kg of urea was supplied to a reactor bowl rotating at a speed of 60 cm/s maintained at a temperature of 89-90° C. The reactor bowl had no baffles on its inner wall.

The polyol and the p-MDI were premixed at room temperature and dosing of the mixture were performed in three steps. In each step, 10.6 g of polyol and 10.6 g of p-MDI was applied. The first dosing was at time 0, the second dosing was at after 4 minutes and the third dosing was after 9 minutes.

Reaction was finished after 18 minutes and the obtained product was left to cool. The product was properly coated. The granules were visually observed and determined to be all properly coated and fully polymerized.

Figure 4:
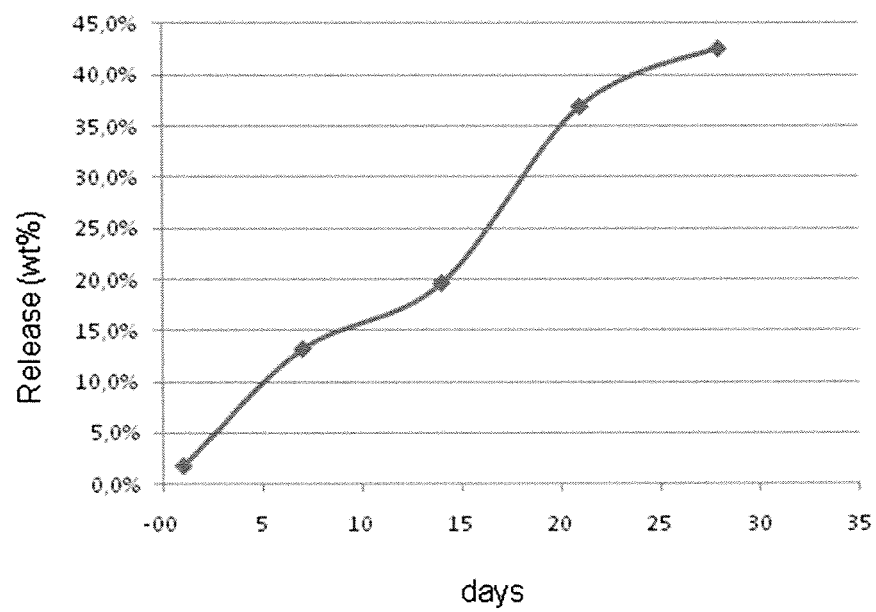

The urea release profile of the granules made according to this example is shown in FIG. 4. Good slow release properties are observed.

Experiment Set II

General Settings of the Drum Used for the Experiment Set II

The drum construction was the same as in the experiment set I. The drum rotation speed was 2.4 RPM (7.54 cm/s).

One end of the drum is provided with an inlet for the urea granules and the other end is provided with an outlet. The temperature at the inlet was maintained at a temperature of 70-75° C. The temperature at the outlet was maintained at a temperature of 83-86° C. Gas was blown through the drum. The temperature of the gas at the gas exit was 82-85° C.

Tubes connected to a polyol supply and tubes connected to an isocyanate supply were inserted through holes provided close to the inlet. Tubes were arranged so that the polyol and the isocyanate can drip from the open ends of the tubes at predetermined positions.

The polyol used was a modified phenolic resin with natural oils. The isocyanate used was a prepolymerized methylene diphenyl diisocyanate (p-MDI).

Preheated urea granules were fed to the drum through its inlet at a rate of 42 kg/hour.

The coating level of the final coated urea products was 8.0 wt % in all experiments. The 8.0 wt % coated urea granules were fully polymerized at the outlet of the drum. These products were analyzed to determine the release of nutrients profile according to the following method.

Slow Release Property Measurement Method 10 g of the 8.0 wt % coated urea granules was added to 500 mL of purified water in a beaker. The beaker was covered by a lid to avoid evaporation of water. The temperature was maintained at $(21\pm0.5)°$ C. with a temperature-control equipment. After 1 day, ultraviolet-visible spectroscopy (UV-Vis) was used to determine the concentration of the absorber in water (nutrients released from coated granules into water). The value of the wavelength of the absorption was 436 nm.

The absorbance indicates how much nutrients have been released into water, i.e. the higher the absorbance, the higher release of the nutrients. The quality of the final coated urea granules can therefore be determined by the absorbance.

Example 2

In the first application zone, a polyol feed was positioned at a longitudinal position 100 mm away from the inlet with a flow rate of 13.36 g/min. A p-MDI feed was positioned at a longitudinal position 175 mm away from the inlet a with flow rate of 12.14 g/min. The ratio between polyol and p-MDI was 1.10. The $1^{st}$ layer coating level was 3.64 wt %.

In the second application zone, a p-MDI feed was positioned at a longitudinal position 375 mm away from the inlet with a flow rate of 7.88 g/min. This resulted in an interval of about 10-12 minutes between the first and the second application zones. A polyol feed was positioned at a longitudinal position 450 mm away from the inlet with a flow rate of 8.66 g/min (ratio between Polyol and p-MDI is 1.10). The $2^{nd}$ layer coating level was 2.36 wt %.

In the third application zone, a p-MDI feed was positioned at a longitudinal position 525 mm away from the inlet with a flow rate of 6.65 g/min. This results in an interval of about 4 minutes between the second and the third application zones. A polyol feed was positioned at a longitudinal position 600 mm away from the inlet with a flow rate of 7.31 g/min (ratio between Polyol and p-MDI is 1.10). The $3^{rd}$ layer coating level was 2.00 wt %.

The stabilization time after the last (third) application zone dosing was about 25-30 minutes. The residence time of the material inside the reaction drum was about 55-60 minutes.

Product quality: 1 day release value was 12.9 wt %. The polymer layer properly covered outside of the urea granule.

Comparative Experiment B: Short Interval

In the first application zone, a polyol feed was positioned at a longitudinal position 100 mm away from the inlet with a flow rate of 13.36 g/min. A p-MDI feed was positioned at a longitudinal position 130 mm away from the inlet with flow rate of 12.14 g/min. The ratio between polyol and p-MDI was 1.10. The $1^{st}$ layer coating level was 3.64 wt %.

In the second application zone, a p-MDI feed was positioned at a longitudinal position 150 mm away from the inlet with a flow-rate of 7.88 g/min. This results in an interval of about 1.5 minutes between the first and the second application zones. A polyol feed was positioned at a longitudinal position 180 mm away from the inlet with a flow-rate of 8.66 g/min (ratio between Polyol and p-MDI is 1.10). The $2^{nd}$ layer coating level was 2.36 wt %.

In the third application zone, a p-MDI feed was positioned at a longitudinal position 200 mm away from the inlet with a flow rate of 6.65 g/min. This resulted in an interval of about 1.5 minutes between the second and the third application zones. A polyol feed was positioned at a longitudinal position 230 mm away from the inlet with a flow rate of 7.31 g/min (ratio between Polyol and pMDI is 1.10). The $3^{rd}$ layer coating level was 2.00 wt %.

The residence time of the material inside the reaction drum was about 55-60 minutes.

Product quality: 1 day release value was 67.8 wt %. Visual inspection of the granules revealed that the granules were not properly covered. Many granules were visible having the same colour as the urea granules which were fed to the reactor, indicating that no coatings were formed on the urea granules. It can be concluded that the short intervals between the application steps does not lead to sufficient spreading of polyol and p-MDI on the granules.

Example 3

In the first application zone, a polyol feed was positioned at a longitudinal position 100 mm away from the inlet with a flow rate of 12.71 g/min. A p-MDI feed was positioned at a longitudinal position 175 mm away from the inlet with a flow rate of 12.10 g/min (ratio between polyol and p-MDI was 1.05). The $1^{st}$ layer coating level was 3.54 wt %.

In the second application zone, a p-MDI feed was positioned at a longitudinal position 425 mm away from the inlet with a flow rate of 8.24 g/min. This resulted in an interval of about 13-15 minutes between the first and the second application zones. A polyol feed was positioned at a longitudinal position 450 mm away from the inlet with a flow rate of 8.66 g/min (ratio between Polyol and p-MDI is 1.05). The $2^{nd}$ layer coating level was 2.41 wt %.

In the third application zone, a p-MDI feed was positioned at a longitudinal position 575 mm away from the inlet with a flow rate of 6.65 g/min. This resulted in an interval of about 6-8 minutes between the second and the third application zones. A polyol feed was positioned at a longitudinal position 600 mm away from the inlet with a flow rate of 7.31 g/min (ratio between Polyol and p-MDI is 1.05). The $3^{rd}$ layer coating level was 2.05 wt %.

The residence time of the material inside the reaction drum was about 55-60 minutes.

Product quality: 1 day release value was 13.7 wt %. The polymer layer properly covered outside of the urea granule.

Comparative Experiment C: Too Low Level of First Coating

In the first application zone, a polyol feed was positioned at a longitudinal position 100 mm away from the inlet with a flow rate of 1.10 g/min. A p-MDI feed was positioned at a longitudinal position 125 mm away from the inlet with a flow rate of 1.00 g/min (ratio between polyol and p-MDI was 1.10). The $1^{st}$ layer coating level was 0.30 wt %.

In the second application zone, a p-MDI feed was positioned at a longitudinal position 275 mm away from the inlet with a flow rate of 11.14 g/min. This resulted in an interval of about 8-10 minutes between the first and the second application zones. A polyol feed was positioned at a longitudinal position 350 mm away from the inlet with a flow rate of 12.26 g/min (ratio between Polyol and p-MDI is 1.10). The $2^{nd}$ layer coating level was 3.34 wt %.

In the third application zone, a p-MDI feed was positioned at a longitudinal position 425 mm away from the inlet with a flow rate of 7.88 g/min. This resulted in an interval of about 4 minutes between the second and the third application zones. A polyol feed was positioned at a longitudinal position 500 mm away from the inlet with a flow rate of 8.66 g/min (ratio between Polyol and p-MDI is 1.10). The $3^{rd}$ layer coating level was 2.36 wt %.

In the fourth application zone, a p-MDI feed was positioned at a longitudinal position 575 mm away from the inlet with a flow rate of 6.65 g/min. This resulted in an interval of about 4 minutes between the third and the fourth application zones. A polyol feed was positioned at a longitudinal position 650 mm away from the inlet with a flow rate of 7.31 g/min (ratio between Polyol and p-MDI is 1.10). The $4^{th}$ layer coating level was 2.00 wt %.

The residence time of the material inside the reaction drum was about 55-60 minutes.

Product quality: 1 day release value was 38.1 wt %. The polymer cover was bad. The first polymer layer was too thin and did not properly cover the urea granule. This caused insufficient polymer layers and many leaking spots on the surfaces of the coated granules.

Comparative Experiment D: Too High Level of First Coating

In the first application zone, a polyol feed was positioned at a longitudinal position 100 mm away from the inlet with a flow rate of 22.00 g/min. A p-MDI feed was positioned at a longitudinal position 175 mm away from the inlet with a flow rate of 20.00 g/min (ratio between polyol and p-MDI was 1.10). The $1^{st}$ layer coating level was 6.00 wt %.

In the second application zone, a p-MDI feed was positioned at a longitudinal position 300 mm away from the inlet with a flow rate of 6.65 g/min. This resulted in an interval of about 10-12 minutes between the first and the second application zones. A polyol feed was positioned at a longitudinal position 375 mm away from the inlet with a flow rate of 7.31 g/min (ratio between Polyol and p-MDI is 1.10). The $2^{nd}$ layer coating level was 2.00 wt %.

The residence time of the material inside the reaction drum was about 55-60 minutes.

Product quality: 1 day release value was 37.3 wt %. The polymer cover was bad. At the first application, the amounts of polyol and p-MDI were too high. This lead to an insufficient reaction for forming the first coating layer and insufficient spreading of these components on the urea granules.

Comparative Experiment E: Too Much Polyol with Respect to pMDI

In the first application zone, a polyol feed was positioned at a longitudinal position 100 mm away from the inlet with a flow rate of 15.15 g/min. A p-MDI feed was positioned at a longitudinal position 175 mm away from the inlet with a flow rate of 10.10 g/min (ratio between polyol and p-MDI was 1.50). The $1^{st}$ layer coating level was 3.61 wt %.

In the second application zone, a p-MDI feed was positioned at a longitudinal position 375 mm away from the inlet with a flow rate of 6.40 g/min. This resulted in an interval of about 10-12 minutes between the first and the second application zones. A polyol feed was positioned at a longitudinal position 450 mm away from the inlet with a flow rate of 9.60 g/min (ratio between Polyol and p-MDI is 1.50). The $2^{nd}$ layer coating level was 2.29 wt %.

In the third application zone, a p-MDI feed was positioned at a longitudinal position 525 mm away from the inlet with a flow rate of 5.90 g/min. This resulted in an interval of about 4 minutes between the second and the third application zones. A polyol feed was positioned at a longitudinal position 600 mm away from the inlet with a flow rate of 8.85 g/min (ratio between Polyol and p-MDI is 1.50). The $3^{rd}$ layer coating level was 2.10 wt %.

The residence time of the material inside the reaction drum was about 55-60 minutes.

Product quality: 1 day release value was 28.6 wt %. The polymer cover was bad, which resulted from the fact that the ratio between polyol and pMDI was too high.

Comparative Experiment F: Too Little Polyol with Respect to pMDI

In the first application zone, a polyol feed was positioned at a longitudinal position 100 mm away from the inlet with a flow rate of 8.63 g/min. A p-MDI feed was positioned at a longitudinal position 175 mm away from the inlet with a flow rate of 11.50 g/min (ratio between polyol and p-MDI was 0.75). The $1^{st}$ layer coating level was 2.88 wt %.

In the second application zone, a p-MDI feed was positioned at a longitudinal position 375 mm away from the inlet with a flow rate of 11.00 g/min. This resulted in an interval of about 10-12 minutes between the first and the second application zones. A polyol feed was positioned at a longitudinal position 450 mm away from the inlet with a flow rate of 8.25 g/min (ratio between Polyol and p-MDI is 0.75). The $2^{nd}$ layer coating level was 2.75 wt %.

In the third application zone, a p-MDI feed was position at a longitudinal position 525 mm away from the inlet with a flow rate of 9.60 g/min. This resulted in an interval of about 4 minutes between the second and the third application zones. A polyol feed was positioned at a longitudinal position 600 mm away from the inlet with a flow rate of 7.20 g/min (ratio between Polyol and p-MDI is 0.75). The 3$^{rd}$ layer coating level was 2.37 wt %.

The residence time of the material inside the reaction drum was about 55-60 minutes.

Product quality: 1 day release value was 29.0 wt %. The polymer cover was bad, which resulted from the fact that the ratio between polyol and pMDI was too low.

The results are summarized in Table 1:

| Exp. | Settings of experiment | 1 day release | Product quality |
|---|---|---|---|
| Ex 2 | Interval of 4-15 minutes after each application zone | 12.9% | Good |
| CEx. B | Interval of 1 minutes after each application zone | 67.8% | Bad |
| Ex 3 | 1$^{st}$ application zone is between 0.5-4.0% of the core granules | 13.7% | Good |
| CEx. C | 1$^{st}$ application zone is 0.3% of the core granules | 38.1% | Bad |
| CEx. D | 1$^{st}$ application zone is 6.0% of the core granules | 37.3% | Bad |
| CEx. E | Ratio between Polyol and pMDI is 1.50 | 28.6% | Bad |
| CEx. F | Ratio between Polyol and pMDI is 0.75 | 29.0% | Bad |

The release properties after 7 days and 14 days were also measured. The releases increased for all experiments, but releases after 7 days and 14 days were much lower in Ex2 and 3 than in CEx.B-F.

Comparison of Ex.2 and CEx. B shows that a sufficient interval (at least 2 minutes) is necessary for a good coating to be formed.

Comparison of Ex.3, CEx. C and CEx. D shows that the first coating layer has to be of a certain weight ratio (0.5-4.0 wt %) with respect to the core granules for a good coating to be formed.

Comparison of Ex.2, CEx. E and CEx. F shows that a certain ratio (about 0.9 to about 1.3) of hydroxyl groups in the polyol to NCO groups in the isocyanate at the end of each of the application zones is necessary for a good coating to be formed.

What is claimed is:

1. A process for producing polyurethane coated fertilizer granules comprising core granules in a rotating drum,
   wherein the drum comprises an inlet and an outlet and n application zones arranged along a longitudinal direction of the drum between the inlet and the outlet, n being an integer of at least 2 and
   wherein each of the application zones is followed by a curing zone,
   wherein the curing zone after each application zone is arranged to allow an interval of at least 2 minutes before the application in the successive application zone, wherein a polyol and an isocyanate are applied in the first application zone at a ratio of 0.5-4 wt %, of the core granules, the process comprising the steps of:
   A) continuously feeding the core granules to the inlet of the rotating drum, thereby providing a flow of the core granules in the longitudinal direction from the inlet to the outlet,
   B1) applying the polyol and the isocyanate to the core granules in each of the n application zones, the ratio of hydroxyl groups in the polyol to NCO groups in the isocyanate at the end of each of the application zones being in the range from about 0.9 to about 1.3,
   B2) reacting the polyol and the isocyanate to form a tack-free polyurethane layer in each of the n curing zones and
   C) continuously collecting the polyurethane coated fertilizer granules from the outlet,
   wherein the polyol is applied first and the isocyanate is applied in a longitudinal position closer to the outlet in the first application zone or the polyol and the isocyanate are applied substantially simultaneously in each of the application zones.

2. The process according to claim 1, wherein n is an integer of between 2 and 15.

3. The process according to claim 1, wherein the curing zone after each application zone is arranged to allow an interval of 2-15 minutes before the application in the successive application zone.

4. The process according to claim 1, wherein the core granules are fed to the inlet of the drum such that the residence time in the drum is 20-90 minutes.

5. The process according to claim 1, wherein the coated polyurethane is 3-20 wt % of the core granules.

6. The process according to claim 1, wherein the polyol and the isocyanate are applied substantially simultaneously in each of the application zones.

7. The process according to claim 1, wherein a catalyst for the reaction of the polyol and the isocyanate is introduced to the drum.

8. The process according to claim 1, wherein the drum is provided with baffles each extending substantially in the longitudinal direction of the drum and having a height of 1-10% of the diameter of the drum.

9. The process according to claim 1, wherein the core granules comprise at least one fertilizer compound comprising urea, potassium sulphate, potassium chloride, ammonium phosphate, ammonium nitrate or a urea containing compounded fertilizer.

10. The process according to claim 1, wherein the polyol and the isocyanate are applied in the first application zone at a ratio of 1-3 wt % of the core granules.

11. The process according to claim 1, wherein the polyol is applied first and the isocyanate is applied in a longitudinal position closer to the outlet in the first application zone.

12. The process according to claim 2, wherein the curing zone after each application zone is arranged to allow an interval of 2-15 minutes before the application in the successive application zone, and wherein the core granules are fed to the inlet of the drum such that the residence time in the drum is 20-90 minutes.

13. The process according to claim 12, wherein the coated polyurethane is 3-20 wt % of the core granules, and wherein the polyol and the isocyanate are applied substantially simultaneously in each of the application zones.

14. The process according to claim 13, wherein a catalyst for the reaction of the polyol and the isocyanate is introduced to the drum, and wherein the drum is provided with baffles each extending substantially in the longitudinal direction of the drum and having a height of 1-10% of the diameter of the drum.

15. The process according to claim 14, wherein the core granules comprise at least one fertilizer compound comprising urea, potassium sulphate, potassium chloride, ammonium phosphate, ammonium nitrate or a urea containing compounded fertilizer, and wherein the polyol and the isocyanate are applied in the first application zone at a ratio of 1-3 wt % of the core granules.

16. The process according to claim 2, wherein the curing zone after each application zone is arranged to allow an interval of 2-15 minutes before the application in the successive application zone, wherein the core granules are fed to the inlet of the drum such that the residence time in the drum is 20-90 minutes, and wherein the coated polyurethane is 3-20 wt % of the core granules.

17. The process according to claim 16, wherein a catalyst for the reaction of the polyol and the isocyanate is introduced to the drum, wherein the drum is provided with baffles each extending substantially in the longitudinal direction of the drum and having a height of 1-10% of the diameter of the drum, wherein the core granules comprise at least one fertilizer compound comprising urea, potassium sulphate, potassium chloride, ammonium phosphate, ammonium nitrate and a urea containing compounded fertilizer, wherein the polyol and the isocyanate are applied in the first application zone at a ratio of 1-3 wt % of the core granules, and wherein the polyol is applied first and the isocyanate is applied in a longitudinal position closer to the outlet in the first application zone.

18. The process according to claim 2, wherein n is an integer of between 2 and 7.

19. The process according to claim 3, wherein the curing zone after each application zone is arranged to allow an interval of 3-5 minutes before the application in the successive application zone.

20. The process according to claim 5, wherein the coated polyurethane is 4-15 wt % of the core granules.

* * * * *